United States Patent [19]

Oetiker

[11] Patent Number: 4,492,004
[45] Date of Patent: Jan. 8, 1985

[54] EARLESS CLAMP STRUCTURE

[76] Inventor: Hans Oetiker, Oberdorfstrasse 21, CH-8810 Horgen, Switzerland

[21] Appl. No.: 446,503

[22] Filed: Dec. 3, 1982

[51] Int. Cl.³ .............................................. B65D 63/02
[52] U.S. Cl. ................ 24/20 R; 24/20 EE; 24/20 TT; 24/20 W; 24/23 W
[58] Field of Search ............. 24/20 R, 20 CW, 20 W, 24/20 EE, 20 SL, 20 TT, 21, 23 R, 23 W, 23 EE, 279, 704

[56] References Cited

U.S. PATENT DOCUMENTS

| 162,725 | 4/1875 | Weil | 24/20 EE |
|---|---|---|---|
| 1,330,737 | 2/1920 | Coffman | 24/20 EE |
| 1,378,508 | 5/1921 | Woodward | 24/20 EE |
| 2,249,764 | 7/1941 | Hothersall | 24/20 EE |
| 2,614,304 | 10/1952 | Oetiker | 24/20 R |
| 3,082,498 | 3/1963 | Oetiker | 24/20 CW |
| 3,266,109 | 8/1966 | Thomas | 24/20 TT |
| 3,286,314 | 11/1966 | Oetiker | 24/20 R |
| 3,293,709 | 12/1966 | Holton | 24/20 TT |
| 3,475,793 | 11/1969 | Oetiker | 24/20 R |
| 3,510,918 | 5/1970 | Oetiker | 24/19 |
| 3,523,337 | 8/1970 | Oetiker | 24/20 R |
| 4,299,012 | 11/1981 | Oetiker | 24/20 W |
| 4,315,348 | 2/1982 | Oetiker | 24/279 |
| 4,319,385 | 3/1982 | Marchou | 24/20 R |

*Primary Examiner*—Victor N. Sakran
*Attorney, Agent, or Firm*—Craig & Burns

[57] ABSTRACT

A clamp structure especially for use in applications in which space conditions do not permit any projecting parts such as plastically deformable ears, and in which outwardly extending hooks adapted to engage in apertures are used to mechanically interconnect the clamp structure; to enable tightening of the band about an object to be fastened, cold-deformed pressed-out embossments are provided in inner and outer band portions, which extend generally in the circumferential direction so that each pressed-out embossment remains integral at least on both sides thereof, where the tool-engaging surfaces thereof are able to withstand very large tightening forces in the circumferential direction which permit a secure tightening of the clamp structure.

38 Claims, 18 Drawing Figures

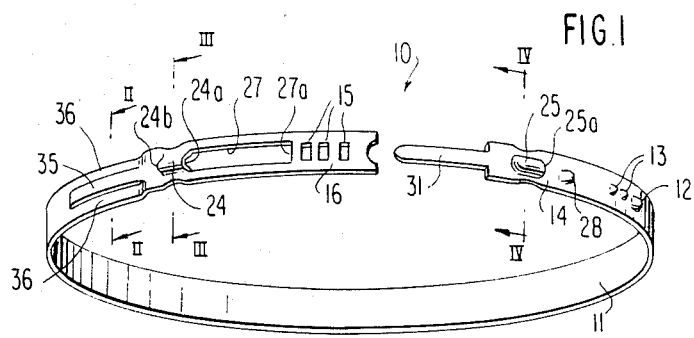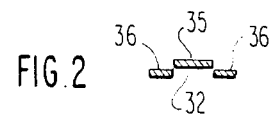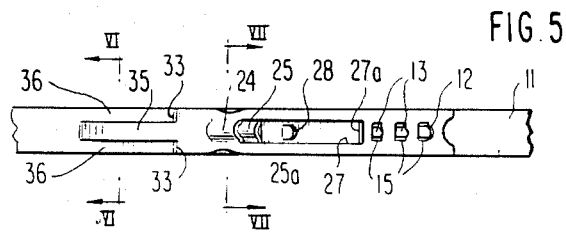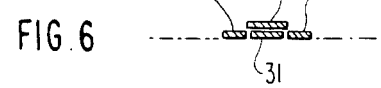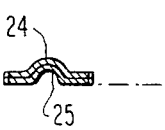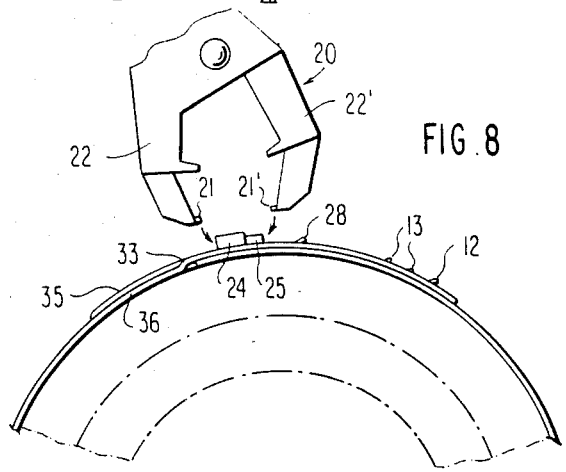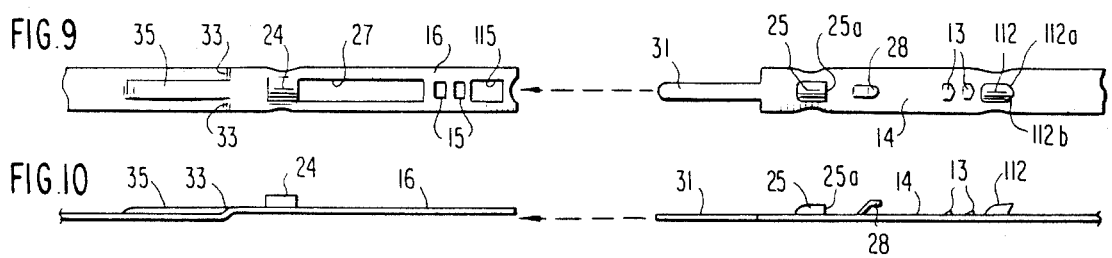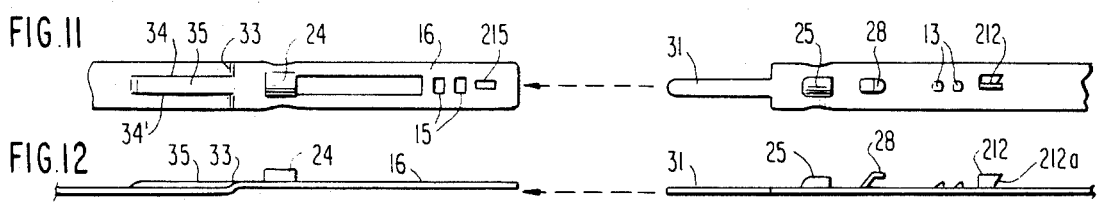

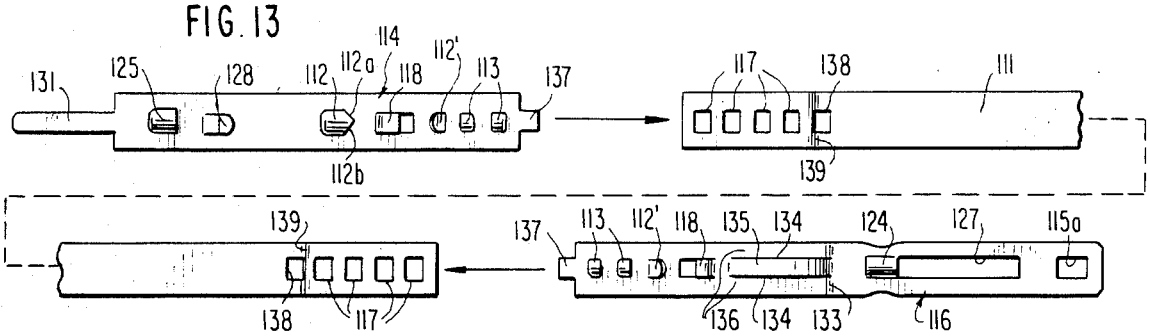
FIG. 13
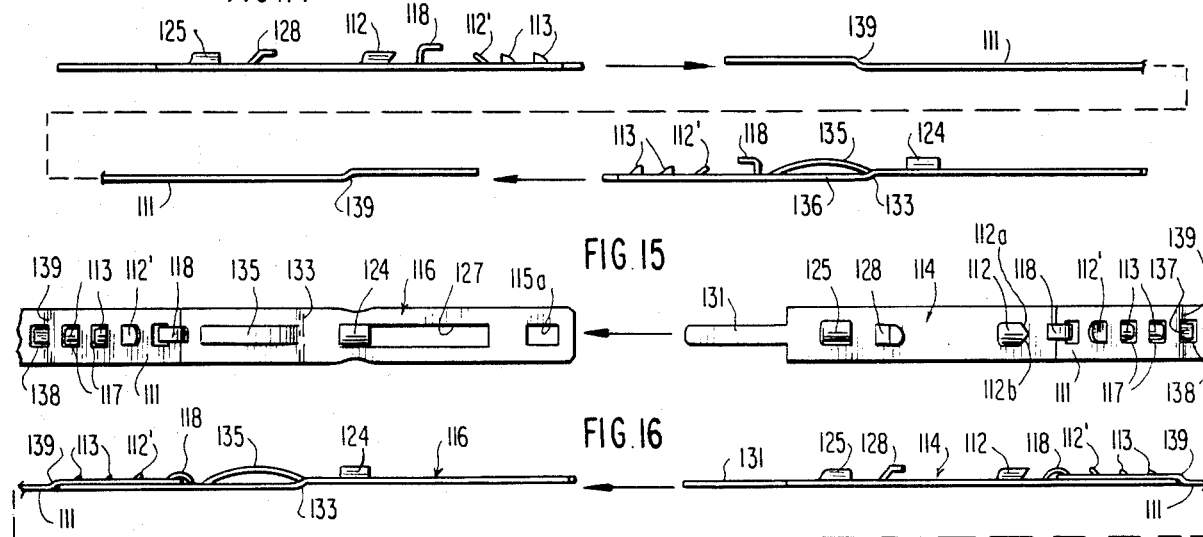
FIG. 14
FIG. 15
FIG. 16
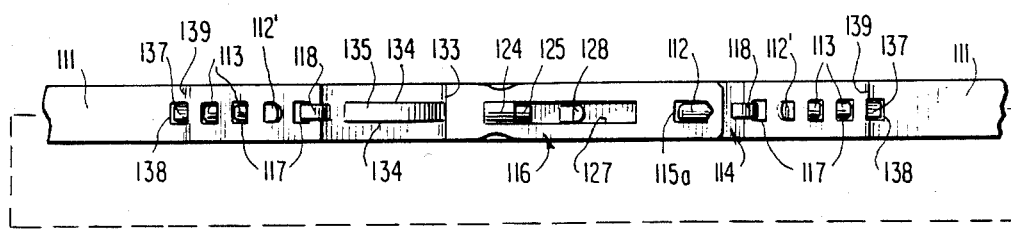
FIG. 17
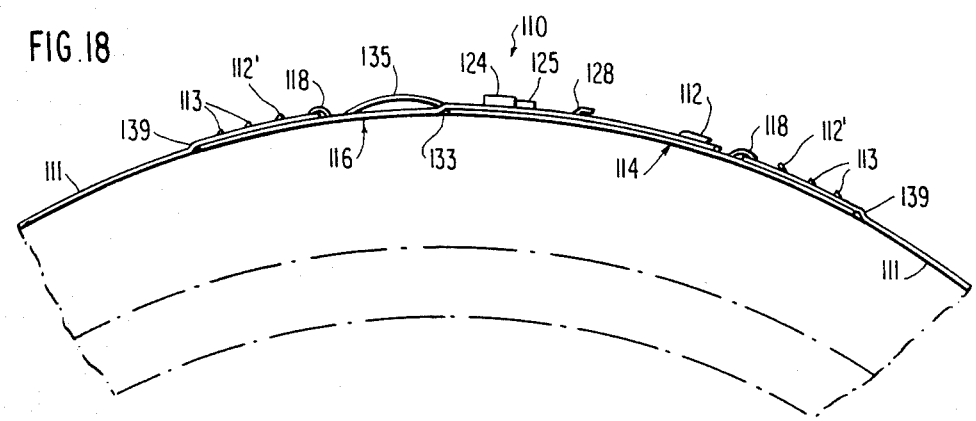
FIG. 18

EARLESS CLAMP STRUCTURE

The present invention relates to a clamp structure and more particularly to a clamp structure for use in applications in which space conditions do not permit any projecting parts such as plastically deformable ears or tightening devices for contracting the clamp structure about an object to be fastened.

BACKGROUND OF THE INVENTION

Plastically deformable ears of the type which have become known as "Oetiker" ears have been used heretofore with great success in a variety of clamp structures. Among these clamp structures, one must differentiate between so-called endless clamp structures and open clamp structures which can be closed when installed about the object to be fastened. While the former permit only an axial installment, the latter permit axial as well as radial installment. My prior U.S. Pat. Nos. 2,614,304 and 3,082,498 are representative of the former type of clamps while my prior U.S. Pat. Nos. 3,465,793; 3,523,337 and 3,510,918 are representative of the latter type. Additionally, known in the prior art are hose clamps with so-called screw-type tightening devices in which the band ends are drawn together by rotating a screw. However, all of these aforementioned types of clamps entail the drawback that they include outwardly projecting parts that in certain applications preclude use of such types of clamps.

More specifically, clamps used with axle boots in the automotive industry, in certain applications, must be devoid of any projecting parts because of space requirements. As a result thereof, closed copper rings were used heretofore in the automotive industry which were shrunk onto the axle boots by the use of "Magnaform" machines. Apart from the high capital expenditures for the machinery necessary to perform the magnetic shrinking operation on metal rings, such as steel or copper rings, this approach inherently involves certain limitations since the copper rings can be installed only axially. Moreover, for service operations, it is necessary, in case the copper ring is still intact, to destruct the copper ring to gain access to the space underneath the axle boot which would then require the axial installation of a new copper ring to be shrunk over the axle boot. Since the machines necessary for shrinking the copper rings over the axle boots are normally not available at the service organization of a retail dealer in view of the high costs connected therewith, it has been common practice to stock preassembled axle parts with copper rings already shrunk onto the axle boots for exchange with corresponding parts in a vehicle requiring service. This complicated and costly approach in servicing axles with axle boots secured by shrunk copper rings was thus also due to the lack of re-useability of the copper ring.

OBJECT OF THE INVENTION

Accordingly, it is a principal object of the present invention to provide a clamp structure which can be used in applications in which space conditions do not permit any projecting parts and which avoids by simple means the aforementioned shortcomings and drawbacks encountered in the prior art.

The underlying problems are solved according to the present invention in that a clamp structure having open ends is mechanically interconnected at the open ends and is provided with tool-engaging embossments in inner and outer band portions which are formed by cold-deformed, pressed-out portions generally in the circumferential direction so that each pressed-out portion remains integral at least on both sides thereof with the respective remaining band portion. As a result thereof, tightening forces of several hundred kg can be readily applied by the use of a tool so that the clamp structure can be securely tightened about the object to be fastened without the use of any other tightening means in the clamp structure itself.

According to another feature of the present invention, the outer band portion is provided adjacent its pressed-out tool-engaging embossment with an elongated opening of such width that the pressed-out tool-engaging embossment of the inner band portion can extend therethrough. The tool-engaging embossments of the inner and outer band portions are thereby preferably of complementary shape so that the inner pressed-out tool-engaging embossment is able to slide underneath the outer pressed-out tool-engaging embossment during the tightening of the clamp structure whereby lateral movement of the inner band portion relative to the outer band portion in the axial direction of the clamp structure is prevented.

According to still another feature of the present invention, the inner band portion may be provided with an outwardly extending hook spaced from the pressed-out tool-engaging embossment by such a distance that the hook, when extending through the opening, will permit a pre-assembly when engaging with the end surface of the opening opposite the tool-engaging embossment in the outer band portion.

In a preferred embodiment of the present invention, the cold-deformed pressed-out tool-engaging embossments have an at least approximately circularly shaped configuration in axial cross section through the clamp structure so that each pressed-out portion is integral with the respective inner and outer band portion at least along the two sides thereof.

According to still a further feature of the present invention, the inner and outer band portions are provided with further means effectively eliminating any step in the area of overlap thereof, which is formed by a tongue-like extension at the free end of the inner band portion operable to engage in a tongue-receiving opening or channel formed by an outwardly directed step in the outer band portion on the side of its tool-engaging embossment opposite the opening. In a particularly simple construction, only one outwardly extending cold-deformed hook with an engaging and abutment surfaces performing both guide and support functions which extends out of the plane of the inner band portion while being integral therewith over at least a substantial part of its remaining contour, provides by its engagement in a corresponding aperture the mechanical connection between the inner and outer band portions. The engaging and abutment surfaces of this cold-deformed hook are thereby approximately V-shaped, as seen in plan view.

If the inner and outer band portions are standard parts and are adapted to be mechanically connected with a clamping band of suitable length, then it is possible to produce a clamp structure of any desired diametric dimension by merely cutting the band to suitable length and punching out apertures near the two ends thereof for engagement with the hooks in the corresponding part of the inner and outer band portions. This permits a simple "do-it-yourself" approach requiring only two standard parts and a supply of clamping bands adapted to be cut and prepared by a tool designed therefor.

These and other objects, features and advantages of the present invention will become more apparent from the following description when taken in connection with the accompanying drawing, which shows, for purposes of illustration only, several embodiments in accordance with the present invention, and wherein:

FIG. 1 is a perspective view of an earless clamp structure in accordance with the present invention;

FIG. 2 is a cross-sectional view taken along line II—II of FIG. 1;

FIG. 3 is a cross-sectional view taken along line III—III of FIG. 1;

FIG. 4 is a cross-sectional view taken along line IV—IV of FIG. 1;

FIG. 5 is a plan view on the area of the mechanical interconnection of the earless clamp structure illustrated in FIG. 1 with the two ends thereof mechanically interconnected;

FIG. 6 is a cross-sectional view taken along line VI—VI of FIG. 5;

FIG. 7 is a cross-sectional view taken along line VII—VII of FIG. 5;

FIG. 8 is an axial elevational view on a part of the clamp structure of FIG. 1, indicating the manner of installation by the use of a clamping tool;

FIG. 9 is a plan view on a modified embodiment of a clamp structure in accordance with the present invention, in which the inner band portion is provided with two support hooks as well as with an additional cold-deformed hook performing both guide and support functions;

FIG. 10 is an elevational view of the part of the clamp structure illustrated in FIG. 9;

FIG. 11 is a plan view on a part of a still further modified embodiment of a clamp structure in accordance with the present invention, in which the inner band portion is provided with two support hooks and a further hook performing both guide and support functions;

FIG. 12 is an elevational view of the part of the clamp structure illustrated in FIG. 11;

FIG. 13 is a plan view on a modified embodiment of an earless three-partite clamp structure in accordance with the present invention consisting of two standard parts and of a clamping band;

FIG. 14 is an elevational view of the parts of the clamp structure illustrated in FIG. 13;

FIG. 15 is a plan view on the clamp structure of FIG. 13 showing the two standard parts assembled to the clamping band while the two standard parts are not yet mechanically interconnected;

FIG. 16 is an elevational view of the clamp structure of FIG. 15;

FIG. 17 is a plan view on the three-partite clamp structure of FIGS. 13 through 16 showing all the parts thereof in the assembled condition; and FIG. 18 is an elevational view of the assembled clamp structure of FIG. 17.

Referring now to the drawings wherein like reference numerals are used throughout the various views to designate like parts, and more particularly to FIGS. 1–8, reference numeral 10 generally designates in FIG. 1 an earless clamp structure which includes a clamping band 11 having open ends adapted to be mechanically interconnected. The mechanical interconnection is effected by an outwardly extending guide hook 12 and two support hooks 13 provided on the inner band portion 14 which are adapted to engage in apertures 15 provided in the outer band portion 16. The guide and support hooks 12 and 13 may thereby be constructed as disclosed in my prior U.S. Pat. No. 4,299,012.

To enable tightening of the clamp structure about an object to be fastened by the use of a tightening tool generally designated by reference numeral 20 (FIG. 8) and having mutually facing end portions 21 and 21' provided at the end of the jaws 22 and 22' of the pincer-like tightening tool 20, the outer and inner band portions are each provided with a tool-engaging abutment 24 and 25, respectively, in the form of cold-deformed pressed-out embossments of at least approximately semi-circularly shaped cross section (FIGS. 3 and 4). The pressed-out tool-engaging embossment 24 in the outer band portion 16 is thereby essentially semi-cylindrical with transverse abutment surfaces 24a and 24b while its cylindrical walls in the axial direction are integral with the outer band portion 16. The cold-deformed pressed-out tool-engaging embossment 25 of the inner band portion 14, in contrast thereto, has only one tool-engaging abutment surface 25a while being integral with the inner band portion 14 substantially over its remaining contour. The outer band portion 16 is also provided with an elongated slot or opening 27 between its pressed-out embossment 24 and the apertures 15 which is of such width that the pressed-out tool-engaging abutment 25 of the inner band portion 14 can extend therethrough. Moreover, the inner and outer pressed-out embossments 25 and 24 are thereby of complementary shape (FIG. 7) so that the pressed-out embossment 25 of the inner band portion 14 can slide underneath the pressed-out embossment 24 of the outer band portion 16 during tightening of the clamp by means of the tightening tool 20.

To enable a sort of pre-assembly, a further outwardly extending hook 28 is provided in the inner band portion 14 adjacent the pressed-out embossment 25 which is also adapted to extend through the opening 27 and provide pre-assembly when coming into abutment with the end face 27a of the opening 27. The hook 28 may thereby be a simple punched-out hook of tab-like configuration.

Since it becomes increasingly important with the thinner and harder plastic hose materials to avoid any step or discontinuity along the inner object-engaging surfaces of the clamp structure, the clamp structure in accordance with the present invention is provided with further means which eliminates any step. These means are similar to the means disclosed in my prior U.S. Pat. No. 4,299,012 and U.S. Pat. No. 4,315,348 and include a tongue-like extension 31 at the free end of the inner band portion 14 which is adapted to engage in a tongue-receiving channel 32 (FIG. 2) formed by a step 33 and two longitudinal cuts 34 and 34' which permit the formation of the channel 32 by pressing out the central band portion 35 relative to the lateral band portions 36 remaining on both sides of the cuts 34 and 34'. As described more fully in my aforementioned two patents, in the assembled condition (FIG. 8), the tongue-like extension 31 will engage in channel 32 so that any step is effectively eliminated thereby. The means for eliminating any step or discontinuity may of course also be modified as disclosed in my aforementioned prior patents.

FIG. 9 illustrates a preferred embodiment in accordance with the present invention in which the guide hook 12 of the embodiment of FIGS. 1–8 is replaced by a cold-deformed hook 112 performing both guide and support functions. This hook 112 is thereby cold-deformed out of the inner band material 14 in such a manner that it is separated from the inner band portion 14 only along the guide and abutment surfaces 112a and 112b which are substantially V-shaped as viewed in plan view in FIG. 9. Along the rest of its contour, the cold-deformed hook 112 is integral with the inner band portion.

In the embodiment of FIGS. 11 and 12, the guide hook 12 of the embodiment of FIGS. 1–8 is replaced by a guide and support hook 212 which is of tab-like configuration, pressed-out of the band material and extending generally in the circumferential direction, which is provided with a guide surface 212a, much in the manner of the tab 4 of my prior U.S. Pat. No. 3,286,314.

The modified embodiment of an earless clamp structure illustrated in FIGS. 13 through 18, in which similar reference numerals of the 100 series are used to designate parts corresponding to those of the clamp structure of FIGS. 1 through 12, consists of three parts, namely a clamping band 11 and of two connecting parts generally designated by reference numerals 114 and 116 formed by corresponding band portions. The open ends of the clamping band 111 are thereby adapted to be mechanically connected with a respective band portion 114 and 116 while the latter are adapted to be mechanically interconnected in a manner similar to the mechanical interconnection described in connection with the embodiment of FIGS. 1 through 12. More specifically, the band part 116 is mechanically connected with the clamping band 111 by means of a guide hook 112' and two support hooks 113 provided on the part 116 which are adapted to engage in apertures 117 provided near one end of the clamping band 111. Similarly, the band part 114 is adapted to be mechanically connected with the opposite end of the clamping band by means of a guide hook 112' and two support hooks 113 adapted to engage in apertures 117, in the manner more fully disclosed in my prior U.S. Pat. No. 4,299,012. To permit preassembly, a further approximately L-shaped hook 118 is provided on each of the band parts 114 and 116 (FIGS. 13 and 14), which is adapted to be bent over the corresponding end of the clamping band 111, as shown in FIGS. 15 and 16 in order to hold the parts 114 and 116 fixed in position relative to the clamping band 111.

To enable tightening of the clamp structure about the object to be fastened by the use of a tightening tool, similar to the tool 20 illustrated in FIG. 8, the band portions 116 and 114 are each provided with a tool-engaging abutment 124 and 125, respectively, constituted by cold-deformed, pressed-out embossments of at least approximately semi-circularly shape in cross-section, whereby the pressed-out tool engaging embossment 124 in the band portion 116 is essentially semi-cylindrical with transverse abutment surfaces 124a and 124b while its longitudinal cylindrical walls are integral with the outer band portion 116. In contrast thereto, the cold deformed pressed-out tool engaging embossment 125 of the band portion 114 only has one tool engaging abutment surface 125a while being integral with the band portion 114 substantially over its remaining contour.

The band portion 116 is again provided with an elongated opening 127 which is of such width that the pressed out tool engaging abutment 125 of the band portion 114 can extend therethrough. An outwardly extending hook 128 is also provided again in the band portion 114 adjacent the pressed-out embossment 125, which is adapted to extend through the opening 127 in order to provide a preassembly when in abutment with the end face 127a of the opening 127. Moreover, the inner and outer pressed out embossments 125 and 124 are again of complementary shape as shown in FIG. 7, so that the pressed out embossment 125 of the inner band portion 114 can slide underneath the pressed out embossment 124 of the outer band portion 116 during tightening of the clamp structure by the tightening tool.

The mechanical interlock between the band portions 114 and 116 is thereby effected by a cold-deformed pressed-out hook 112 similar to the hook 112 of FIG. 9 which performs both guide and support functions and to that end is of approximately V-shaped configuration with inclined surfaces 112a and 112b as seen in plan view (FIG. 13). The guide and support hook 112 which is adapted to engage in aperture 115a provided in the band portion 116, due to its particular configuration and construction, is thereby sufficient to withstand the substantial tightening forces required for installing the clamp structure without the use of an ear or the like, which forces may attain, depending on thickness and width of the band, a magnitude of up to 500 kg and more to obtain a clamp structure that seals completely satisfactorily.

To avoid any step or discontinuity along the entire inner object engaging surfaces of the clamp structure, the clamp structure in accordance with the present invention, illustrated in FIGS. 13 through 18, is provided with further means which eliminated any steps in the area of overlap between the band portion 114 and the band portion 116, between the band portion 114 and one end of the clamping band 111 and between the band portion 116 and the opposite end of the clamping band 111. More specifically, to avoid any such step between the band portions 114 and 116, the band portion 114 is again provided with a tongue-like extension 131 adapted to engage in a tongue receiving channel formed by the step 133 and the longitudinal cuts 134 which permit the formation of the tongue receiving channel by pressing out the central part 135, having lateral band portions 136 on both sides thereof.

To avoid a step in the area of overlap between the two ends of the clamping band 111 and the band portions 114 and 116, the latter are each provided with a tongue-like extension 137 adapted to engage in aperture 138 on the side of the step 139 opposite the apertures 117. These means are again similar to the means disclosed in my prior U.S. Pat. Nos. 4,299,012 and 4,315,348.

The clamp structure of FIGS. 13 through 18 offers the additional advantage that it permits the attainment of a clamp structure of any desired diameter by utilizing a "do-it-yourself" approach, so to speak of. For that purpose, it is only necessary to stock as standard parts the band portions 114 and 116 and a roll of clamping band 111, to thereupon cut the clamping band to predetermined length and to form apertures 117 and 138 therein by the use of a tool, such as for example described in my prior U.S. Pat. No. 4,050,154, which may also be modified to produce the step 139. By thus utilizing a three-partite clamp structure consisting of two standard parts, it is possible to make, on the spot, a clamp structure of desired dimensions, utilizing for example, a table indicating the length of the clamping band which must be cut off for a given diametric dimension, when using the standardized parts 114 and 116.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A clamp structure, especially for use in applications in which space conditions do not permit any projecting parts such as plastically deformable ears, comprising clamping band means having open ends formed by an inner and outer band portion intended to overlap, and means mechanically interconnecting the overlapping open ends of the band means including outwardly extending hook means in the inner band portion operable to engage in aperture means in the outer band portion in the installed condition of the clamp structure, characterized in that the means mechanically interconnecting the open ends enable tightening of the band means about an object to be fastened and include tool-engaging means provided in the inner and outer band portions, said tool-engaging means being formed by pressed-out portions pressed-out of the inner and outer band portions and extending generally in the circumferential direction so that each pressed-out portion remains integral at least on both sides thereof with the respective band portion, whereby said tool-engaging means are able to withstand substantial forces in the circumferential direction without tearing which permit a secure tightening of the clamp structure about the object to be fastened without the use of any other tightening means in the clamp structure.

2. A clamp according to claim 1, characterized in that the outer band portion is provided adjacent its pressed-out tool-engaging means with an elongated opening extending in the direction toward the end of the outer band portion and, adjoining said opening, with aperture means receiving said hook means, said opening being of such width that the pressed-out tool-engaging means of the inner band portion can extend therethrough.

3. A clamp structure according to claim 2, characterized in that said inner band portion is provided with an outwardly extending hook spaced from the pressed-out tool-engaging means thereof in the circumferential direction away from the free end thereof, said hook being of such width as to be able to extend through said opening and upon engagement with the end surface of said opening opposite the tool-engaging means determining a pre-assembly position of the two tool-engaging means.

4. A clamp structure according to claim 2, characterized in that the pressed-out tool-engaging means of the inner and outer band portions are of complementary shape so that the inner pressed-out tool-engaging means is able to slide under the outer pressed-out tool-engaging means during tightening of the clamp structure.

5. A clamp structure according to claim 4, characterized in that the pressed-out tool-engaging means have an at least approximately semi-circularly shaped configuration in axial cross section through the clamp structure near at least one end of each pressed-out tool-engaging means to receive a pointed end of a pincer-like tightening tool.

6. A clamp structure according to claim 5, characterized in that the pressed-out tool-engaging means of the inner band portion is separated from the inner band portion by a generally transversely extending cut but is generally integral with the inner band portion over its remaining contour.

7. A clamp structure according to claim 6, characterized in that the pressed-out tool-engaging means of the outer band portion is separated from the outer band portion by two generally transversely extending buts but is integral with the outer band portion along its two sides.

8. A clamp structure according to claim 5, characterized in that the inner and outer band portions are provided with further means effectively eliminating any step in the area of overlap of the free end of the inner band portion and of the overlying outer band portion.

9. A clamp structure according to claim 8, characterized in that said further means includes a tongue-like extension at the free end of the inner band portion operable to engage in a tongue-receiving means formed at least in part by an outwardly directed step in the outer band portion on the side of its tool-engaging means opposite said opening.

10. A clamp structure according to claim 9, characterized in that said tongue-receiving means is formed by two longitudinal cuts in the outer band portion which extend from the step away from the tool-engaging means, said cuts leaving a lateral object-engaging band portion on each side and a central band portion outwardly displaced relative to the lateral band portions and defining in effect a channel for receiving therein said tongue-like extension.

11. A clamp structure according to claim 10, characterized in that at least one hook means is formed by a cold-deformed hook having an engaging and abutment surface means performing both guide and support functions and extending out of the plane of the corresponding band portion while being integral therewith over at least a substantial part of its remaining contour.

12. A clamp structure according to claim 11, characterized in that said engaging and abutment surface means is approximately V-shaped, as seen in plan view.

13. A clamp structure according to claim 10, characterized in that said inner and outer band portions are integral with said band means, and in that at least one hook means is a cold-deformed support hook having a force-engaging abutment surface extending out of the plane of the inner band portion while being integral therewith over at least a substantial part of its remaining contour.

14. A clamp structure according to claim 13, characterized in that another hook means performs a guide function operable to guide the inner and outer band portions relative to one another during tightening of the clamp structure.

15. A clamp structure according to claim 14, wherein said another hook means is a tab-like suspension hook extension generally transversely to the circumferential direction and separated from the respective inner band portion by cuts along its sides and end.

16. A clamp structure according to claim 14, wherein said another hook means is a tab-like hook bent out of the inner band material and extending generally in the circumferential direction, said hook having an inclined end face performing a guiding function.

17. A clamp structure according to claim 14, wherein said another hook means is formed by a cold-deformed hook having an engaging and abutment surface means performing both guide and support functions and extending out of the plane of the corresponding band portion while being integral therewith over at least a substantial part of its remaining contour.

18. A clamp structure according to claim 17, wherein said engaging and abutment surface means is of approximately V-shape, as seen in plan view.

19. A clamp structure according to claim 10, characterized in that said inner and outer band portions are formed by two band portions separate from said band means but in overlapping relationship therewith, said two band portions being provided with said tool-engaging means and each of said band portions being mechanically connected to a respective end of said band means by outwardly extending hook means engaging in corresponding aperture means.

20. A clamp structure according to claim 19, characterized in that the last-mentioned hook means are provided in the band portions and the aperture means are provided near the ends of the band means.

21. A clamp structure according to claim 20, characterized in that each band portion is provided with an approximately L-shaped pre-assembly hook adjacent the innermost hook means which is operable to be bent down in the direction toward and over the free end of the band means to hold the same in a pre-assembled condition relative to the corresponding band portion when the hook means of the band portion are in engagement with the aperture means of the band means.

22. A clamp structure according to claim 20, characterized in that the band portions and the band means are provided with further means effectively eliminating any steps in the area of overlap of the band portions and the respective ends of said band means, said further means including a tongue-like extension at each end of the band means operable to engage in a tongue-receiving means formed at least in part by an outwardly directed step in the band means.

23. A clamp structure according to claim 19, characterized in that in the assembled condition in which the clamp structure is tightened about the object to be fastened, the two band portions are mechanically connected with each other by an outwardly extending hook means in the inner band portion, which simultaneously performs both guide and support functions as it engages in an aperture means provided in the outer band portion.

24. A clamp structure according to claim 23, in which said last-mentioned hook means is a cold-deformed hook having an engaging and abutment surface means that extends out of the plane of the corresponding band portion while being integral therewith over at least a substantial part of its remaining contour.

25. A clamp structure according to claim 24, characterized in that said engaging and abutment surface means is approximately V-shaped, as seen in plan view.

26. A clamp structure according to claim 25, wherein only a single cold-deformed hook engaging in one aperture means mechanically interlocks the two band portions.

27. A clamp structure according to claim 1, wherein the tool-engaging means in the outer band portion is located on the side of the aperture means opposite the free end of the outer band portion and the tool-engaging means in the inner band portion is located between the outwardly extending hook means and the free end of the inner band portion.

28. A clamp structure according to claim 1, wherein the inner band portion is located exclusively radially inwardly of the outer band portion within the area of the mechanical interconnecting means including the tool-engaging means.

29. A mechanical connection according to claim 28, characterized in that said force engaging surface means is of approximately V-shape, as seen in plan view.

30. A mechanical connection according to claim 29, characterized in that only a single such combined guide and support hook is used in the mechanical connection.

31. A mechanical connection between two mutually overlapping band portions forming part of an open clamp structure adapted to be tightened about an object to be fastened, in which at least two outwardly extending hook means provided in the inner band portion are operable to form-lockingly engage in an aperture means provided in the outer band portion, characterized in that at least one hook means is a cold-deformed support hook having a force-engaging surface means and another hook means is a combined guide and support hook having a force-engaging surface means operable to initially guide the inner and outer band portions toward one another and to absorb circumferentially directed forces until assisted in such force absorption by the support hook.

32. A mechanical connection according to claim 31, wherein said combined guide and support hook is a cold-deformed hook with the force-engaging surface means along the end thereof away from the free end of the inner band portion.

33. A mechanical connection according to claim 31, wherein said combined guide and support hook is a tab-like member pressed out of the inner band portion and extending generally in the circumferential direction of the clamp structure, said force-engaging surface means being formed by the inclined, upwardly extending rear edge of the tab-like member facing away from the free end of the inner band portion.

34. A three-partite clamp structure, especially for use in applications in which space conditions do not permit any projecting parts, such as plastically deformable ears, which consists of two standard parts and of a band means of a length depending on the desired diameter of the clamp structure in the installed condition when tightened about an object to be fastened, characterized in that two parts formed by two band portions are operable to be mechanically connected with each other in the area of overlap thereof by at least one outwardly extending hook means in the inner band portion engaging in an aperture means in the outer band portion, in that a respective band portion is mechanically connected with the corresponding end of the band means by hook means engaging in aperture means, and in that the inner and outer band portions are provided with tool-engaging means offering substantial resistance in the circumferential direction, whereby clamp structures of different diameter can be obtained by choosing a suitable length of band means, the tool-engaging means being constituted by cold-deformed, pressed-out portions extending generally in the circumferential direction of the clamp structure so that each pressed-out portion remains integral at least on both sides thereof with the respective band portion and the tool-engaging means are able to withstand substantial forces in the circumferential direction without tearing to permit a secure tightening of the clamp structure about the object to be fastened by engagement of the hook means in the aperture means without the use of any other tightening means in the clamp structure.

35. A clamp structure according to claim 34, characterized in that the pressed-out tool-engaging means of the inner and outer band portions are of complementary shape so that the inner pressed-out tool-engaging means is able to slide under the outer pressed-out tool-engaging means during tightening of the clamp structure.

36. A clamp structure according to claim 34, characterized in that within each area of overlap of a band portion and the band means, further means are provided effectively eliminating any step therebetween near an inner free end.

37. A clamp structure according to claim 34, characterized in that within each area of overlap of a band portion and the band means, further means are provided effectively eliminating any step therebetween near an inner free end.

38. A clamp structure according to claim 37, characterized in that the further means includes a tongue-like extension at each inner end of one of the three parts operable to engage in a tongue-receiving means formed at least in part by an outwardly directed step in the respective overlying band part.

* * * * *